US012645230B2

(12) United States Patent
Yoshikawa et al.

(10) Patent No.: US 12,645,230 B2
(45) Date of Patent: Jun. 2, 2026

(54) CONTROL SYSTEM, CONTROL METHOD, AND NON-TRANSITORY STORAGE MEDIUM

(71) Applicant: TOYOTA JIDOSHA KABUSHIKI KAISHA, Toyota (JP)

(72) Inventors: Kei Yoshikawa, Nagoya (JP); Shiro Oda, Anjo (JP); Takeshi Matsui, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 18/606,174

(22) Filed: Mar. 15, 2024

(65) Prior Publication Data
US 2024/0353866 A1 Oct. 24, 2024

(30) Foreign Application Priority Data
Apr. 19, 2023 (JP) ................................. 2023-068267

(51) Int. Cl.
*G05D 1/82* (2024.01)
*G05D 1/223* (2024.01)
*G05D 101/15* (2024.01)
*G05D 105/30* (2024.01)

(52) U.S. Cl.
CPC ............. *G05D 1/82* (2024.01); *G05D 1/2232* (2024.01); *G05D 2101/15* (2024.01); *G05D 2105/31* (2024.01)

(58) Field of Classification Search
CPC .... G05D 1/82; G05D 1/2232; G05D 2101/15; G05D 2105/31; G05D 1/2248; G05D 1/2247; G05D 2101/20; G05D 2107/65; G05D 2109/10; G05D 1/43; G05D 1/2435; G05D 1/246; G05D 1/633; G05D 1/644; G05D 1/648; G05D 1/661; G05D 2105/20; G06V 20/58; G06V 40/103
See application file for complete search history.

(56) References Cited

U.S. PATENT DOCUMENTS 10,387,634 B1 * 8/2019 Lindell ................... G06F 21/35
2018/0317725 A1 11/2018 Lee et al.
2020/0317190 A1 10/2020 Tong et al.
(Continued)

FOREIGN PATENT DOCUMENTS

CN     109101018 A * 12/2018 ........... G05D 1/0257
CN     115229794 A * 10/2022 ............ B25J 9/1602
(Continued)

OTHER PUBLICATIONS

English Translation of CN-109101018-A (Year: 2025).*
CN115229794A—English Translation (Year: 2026).*

*Primary Examiner* — Erin M Piateski
*Assistant Examiner* — Eisen Yim
(74) *Attorney, Agent, or Firm* — Oliff PLC

(57) ABSTRACT

A control system includes one or more processors configured to perform system control for controlling a system including a mobile robot configured to move autonomously and to be operated by a user based on a feature of a mobile body present around an operation interface configured to operate the mobile robot. The system control includes change control for changing operation limitation on the operation interface when the feature satisfies a predetermined condition.

10 Claims, 12 Drawing Sheets

(56)          References Cited

U.S. PATENT DOCUMENTS

| | | | |
|---|---|---|---|
| 2021/0157318 A1* | 5/2021 | Takai .................. | G05D 1/0223 |
| 2023/0300139 A1* | 9/2023 | Sarkar .................. | H04L 63/102 |
| | | | 726/4 |
| 2023/0319033 A1* | 10/2023 | Hanson ................ | H04L 63/108 |
| | | | 726/4 |

FOREIGN PATENT DOCUMENTS

| | | |
|---|---|---|
| JP | 2021-508902 A | 3/2021 |
| JP | 2021-099846 A | 7/2021 |
| KR | 10-2022-0018905 A | 2/2022 |
| WO | 2018058338 A1 | 4/2018 |

* cited by examiner

| CATEGORY | | CLOTHING COLOR |
|---|---|---|
| NON-STAFF | | UNIDENTIFIED |
| STAFF | PHARMACIST | YELLOW |
| | NURSE | PURPLE |
| | ⋮ | ⋮ |

CONTROL SYSTEM, CONTROL METHOD, AND NON-TRANSITORY STORAGE MEDIUM

CROSS-REFERENCE TO RELATED APPLICATION

This application claims priority to Japanese Patent Application No. 2023-068267 filed on Apr. 19, 2023, incorporated herein by reference in its entirety.

BACKGROUND

1. Technical Field

The present disclosure relates to a control system, a control method, and a non-transitory storage medium.

2. Description of Related Art

Japanese Unexamined Patent Application Publication (Translation of PCT Application) No. 2021-508902 (JP 2021-508902 A) discloses a robot control system.

SUMMARY

When a mobile robot is operable by an operator, safety for the surroundings of the mobile robot varies depending on the operator. Therefore, it is difficult to ensure the safety. Such a problem cannot be solved by the technology described in JP 2021-508902 A.

The present disclosure provides a control system, a control method, and a non-transitory storage medium in which safety for the surroundings of a mobile robot that is movable autonomously and is operable by a user can be prevented from varying depending on an operator, thereby improving the safety.

A control system according to a first aspect of the present disclosure includes one or more processors configured to perform system control for controlling a system including a mobile robot configured to move autonomously and to be operated by a user based on a feature of a mobile body present around an operation interface configured to operate the mobile robot. The system control includes change control for changing operation limitation on the operation interface when the feature satisfies a predetermined condition. With such a configuration, the control system can prevent the safety for the surroundings of the mobile robot from varying depending on the operator, thereby improving the safety. In autonomous movement control, the mobile robot may be controlled to move autonomously using a learning model obtained through machine learning.

In the control system according to the first aspect of the present disclosure, the predetermined condition may be that the feature is a feature indicating a non-staff person who is not a staff member of a facility where the mobile robot is operated or a feature indicating a child, and the change control may be control for imposing the operation limitation on the operation interface when the feature satisfies the predetermined condition. With such a configuration, the control system is configured to, in a case where an operator who may reduce safety if the operation interface is operated is present near the operation interface, impose the operation limitation compared to a case where an operator who can maintain safety if the operation interface is operated is present near the operation interface. Thus, the safety can be prevented from varying depending on the operator.

In the control system according to the first aspect of the present disclosure, the predetermined condition may be that the feature is a feature indicating a staff member of a facility where the mobile robot is operated, and the change control may be control for relaxing the operation limitation on the operation interface when the feature satisfies the predetermined condition. With such a configuration, the control system is configured to impose the operation limitation when an operator who may reduce safety if the operation interface is operated is present near the operation interface, and relax the operation limitation when an operator who can maintain safety if the operation interface is operated is present near the operation interface. Thus, the safety can be prevented from varying depending on the operator.

In the control system according to the first aspect of the present disclosure, the operation interface may include at least one of an interface to be displayed on a display device installed on the mobile robot, a joystick device installed on the mobile robot, and an operation device configured to remotely operate the mobile robot. With such a configuration, the control system can prevent the safety of the operation interface installed on the mobile robot from varying depending on the operator.

In the control system according to the first aspect of the present disclosure, the system control may include control for stopping the mobile robot when the predetermined condition is satisfied. With such a configuration, the control system is configured to, when the predetermined condition is satisfied, perform not only the operation limitation change control but also the stop control on the mobile robot, thereby further improving the safety.

In the control system according to the first aspect of the present disclosure, the one or more processors may be configured to recognize the feature based on an image obtained by imaging surroundings of the operation interface. With such a configuration, the control system can accurately recognize the feature.

In the control system according to the first aspect of the present disclosure, the one or more processors may be configured to determine whether the feature satisfies the predetermined condition using a learning model configured to receive an image obtained by imaging surroundings of the operation interface and output information indicating whether the image satisfies the predetermined condition. With such a configuration, the control system can accurately determine whether the predetermined condition is satisfied.

In the control system according to the first aspect of the present disclosure, the operation limitation may be limitation for prohibiting part or all of operations on the operation interface. With such a configuration, the control system can prohibit the operations on the operation interface when the predetermined condition is satisfied, thereby further preventing the safety from varying depending on the operator.

In the control system according to the first aspect of the present disclosure, the operation limitation may be limitation for giving difficulty to part or all of operations on the operation interface. With such a configuration, the control system can give difficulty to the operations on the operation interface when the predetermined condition is satisfied, thereby further preventing the safety from varying depending on the operator.

In the control system according to the first aspect of the present disclosure, the system control may include at least one of control for changing at least one of details of notification and a method for notification on the operation interface when the feature satisfies the predetermined condition and control for displaying a captured image of the mobile body on the operation interface when the feature satisfies the predetermined condition. With such a configuration, the control system can perform at least one of the notification on the operation interface and the display of the captured image of the mobile body when the predetermined condition is satisfied. In the control system, in a case where an operator who may reduce safety if the operation interface is operated is present near the operation interface, it is possible to suppress the operator's attempt to operate it. Therefore, it is possible to further prevent the safety from varying depending on the operator.

A control method according to a second aspect of the present disclosure includes performing system control for controlling a system including a mobile robot configured to move autonomously and to be operated by a user based on a feature of a mobile body present around an operation interface configured to operate the mobile robot. The system control includes change control for changing operation limitation on the operation interface when the feature satisfies a predetermined condition. With such a configuration in the control method, the safety for the surroundings of the mobile robot can be prevented from varying depending on the operator, thereby improving the safety.

In the control method according to the second aspect of the present disclosure, the predetermined condition may be that the feature is a feature indicating a non-staff person who is not a staff member of a facility where the mobile robot is operated or a feature indicating a child, and the change control may be control for imposing the operation limitation on the operation interface when the feature satisfies the predetermined condition. With such a configuration in the control method, in a case where an operator who may reduce safety if the operation interface is operated is present near the operation interface, the operation limitation is imposed compared to a case where an operator who can maintain safety if the operation interface is operated is present near the operation interface. Thus, the safety can be prevented from varying depending on the operator.

In the control method according to the second aspect of the present disclosure, the predetermined condition may be that the feature is a feature indicating a staff member of a facility where the mobile robot is operated, and the change control may be control for relaxing the operation limitation on the operation interface when the feature satisfies the predetermined condition. With such a configuration in the control method, the operation limitation is imposed when an operator who may reduce safety if the operation interface is operated is present near the operation interface, and the operation limitation is relaxed when an operator who can maintain safety if the operation interface is operated is present near the operation interface. Thus, the safety can be prevented from varying depending on the operator.

In the control method according to the second aspect of the present disclosure, the operation interface may include at least one of an interface to be displayed on a display device installed on the mobile robot, a joystick device installed on the mobile robot, and an operation device configured to remotely operate the mobile robot. With such a configuration in the control method, the safety of the operation interface installed on the mobile robot can be prevented from varying depending on the operator.

In the control method according to the second aspect of the present disclosure, the system control may include control for stopping the mobile robot when the predetermined condition is satisfied. With such a configuration in the control method, when the predetermined condition is satisfied, not only the operation limitation change control but also the stop control on the mobile robot is performed, thereby further improving the safety.

In the control method according to the second aspect of the present disclosure, the feature may be recognized based on an image obtained by imaging surroundings of the operation interface. With such a configuration in the control method, the feature can be recognized accurately.

In the control method according to the second aspect of the present disclosure, determination as to whether the feature satisfies the predetermined condition may be made using a learning model configured to receive an image obtained by imaging surroundings of the operation interface and output information indicating whether the image satisfies the predetermined condition. With such a configuration in the control method, the determination as to whether the predetermined condition is satisfied can be made accurately.

In the control method according to the second aspect of the present disclosure, the operation limitation may be limitation for prohibiting part or all of operations on the operation interface. With such a configuration in the control method, the operations on the operation interface can be prohibited when the predetermined condition is satisfied, thereby further preventing the safety from varying depending on the operator.

In the control method according to the second aspect of the present disclosure, the operation limitation may be limitation for giving difficulty to part or all of operations on the operation interface. With such a configuration in the control method, difficulty can be given to the operations on the operation interface when the predetermined condition is satisfied, thereby further preventing the safety from varying depending on the operator.

A non-transitory storage medium according to a third aspect of the present disclosure stores instructions that are executable by one or more processors and that cause the one or more processors to perform functions including performing a process of performing system control for controlling a system including a mobile robot configured to move autonomously and to be operated by a user based on a feature of a mobile body present around an operation interface configured to operate the mobile robot. The system control includes change control for changing operation limitation on the operation interface when the feature satisfies a predetermined condition. With such a configuration in the non-transitory storage medium, the safety for the surroundings of the mobile robot can be prevented from varying depending on the operator, thereby improving the safety.

According to the present disclosure, it is possible to provide the control system, the control method, and the non-transitory storage medium in which the safety for the surroundings of the mobile robot that is movable autonomously and is operable by the user can be prevented from varying depending on the operator, thereby improving the safety.

BRIEF DESCRIPTION OF THE DRAWINGS

Features, advantages, and technical and industrial significance of exemplary embodiments of the invention will be described below with reference to the accompanying drawings, in which like signs denote like elements, and wherein:

FIG. 5 is a diagram showing an example of classification into non-staff persons and staff members determined by the control computer in FIG. 4;

DETAILED DESCRIPTION OF EMBODIMENTS

Hereinafter, the present disclosure will be described based on an embodiment of the disclosure. However, the disclosure according to the claims is not limited to the following embodiment. All the configurations described in the embodiment are not necessarily essential as means for solving the problem.

Embodiment

Figure 1:
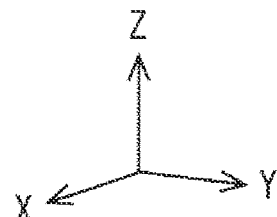
FIG. 1 is a perspective view showing an example of the overall configuration of a mobile robot to be controlled by a control system according to an embodiment.
Figure 2:
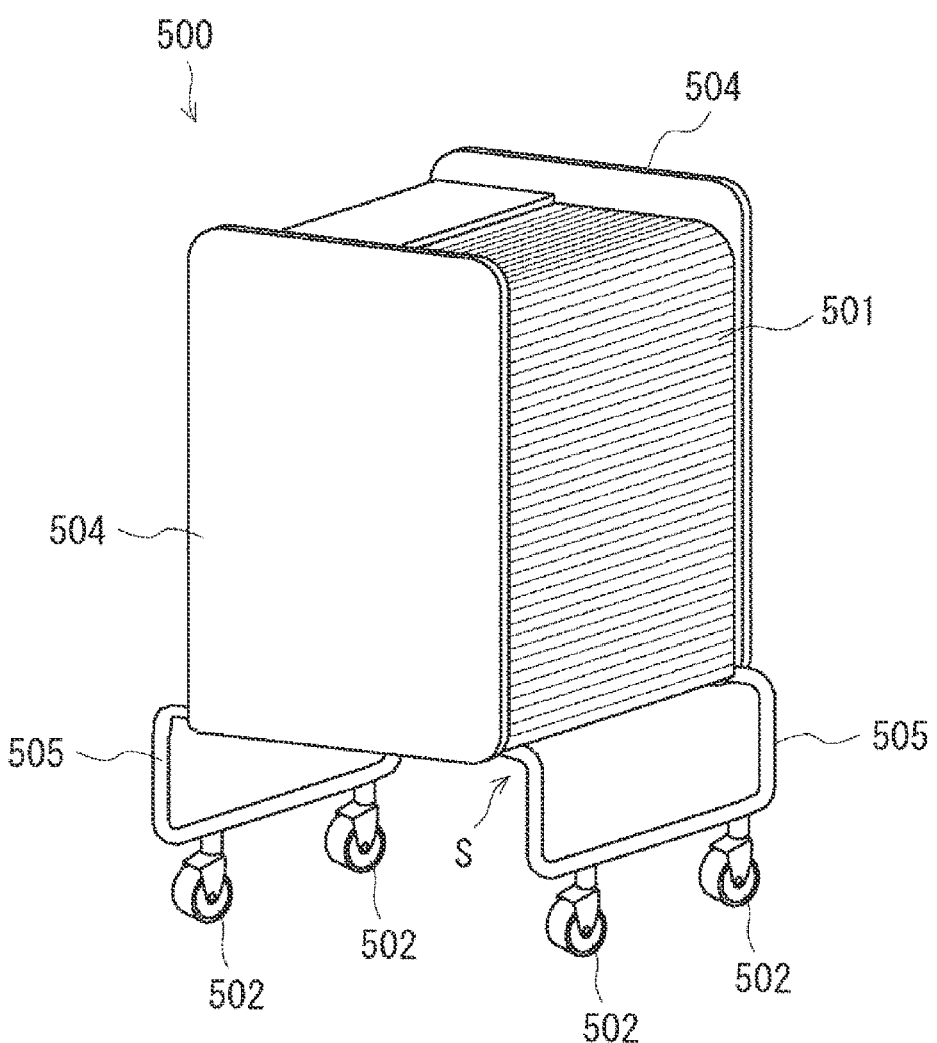
FIG. 2 is a perspective view showing an example of the overall configuration of a wagon to be transported by the mobile robot in FIG. 1.
Figure 2:
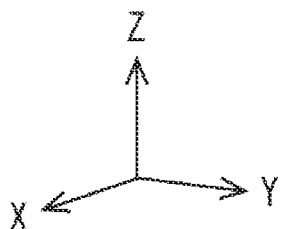

A control system according to the present embodiment performs system control for controlling a system including a mobile robot that is movable autonomously and is operable by a user. This mobile robot can be configured to transport an object. Although such an example will be described below, the mobile robot need not be configured to transport an object. In the case where the mobile robot is configured to transport an object, the mobile robot can also be referred to as "transport robot", and the system can also be referred to as "transport system". An example of the configuration of the mobile robot according to the present embodiment will be described below with reference to FIGS. 1 and 2. FIG. 1 is a perspective view showing an example of the overall configuration of the mobile robot to be controlled by the control system according to the present embodiment, and FIG. 2 is a perspective view showing an example of the overall configuration of a wagon to be transported by the mobile robot in FIG. 1.

The above system such as the transport system only needs to include a mobile robot such as a mobile robot 100 shown in FIG. 1, but may further include other devices such as a host management device. For simplicity of description, an example will first be given in which the transport system is composed of the mobile robot 100 alone. The main features of the transport system will be described. In this example, the control system can refer to either the mobile robot 100 itself or components of a control system in the mobile robot 100.

In the following description, an XYZ orthogonal coordinate system will be used as appropriate. An X direction is a front-rear direction of the mobile robot 100 shown in FIG. 1, a Y direction is a right-left direction, and a Z direction is a vertical up-down direction. More specifically, a +X direction is defined as a forward direction of the mobile robot 100, and a –X direction is defined as a rearward direction of the mobile robot 100. A +Y direction is a leftward direction of the mobile robot 100, and a-Y direction is a rightward direction of the mobile robot 100. A +Z direction is a vertically upward direction, and a-Z direction is a vertically downward direction.

The mobile robot 100 can move in both the forward and rearward directions. That is, the mobile robot 100 moves in the forward direction when its wheels are rotated forward, and moves in the rearward direction when the wheels are rotated in reverse. Changing the rotational speed between the right and left wheels allows the mobile robot 100 to turn right or left.

As shown in FIG. 1, the mobile robot 100 may include a platform 110 on which an object to be transported is loaded, a stand 120, and an operation unit 130. The platform 110 is equipped with wheels 111, axles, a battery, a control computer 101, a drive motor, etc. It is assumed that the control computer 101 is mounted at the illustrated position in the platform 110. However, the control computer 101 need not necessarily be mounted at this position. The control computer 101 may be mounted at any other position in the platform 110, or part of the control computer 101 or the entire control computer 101 may be mounted in either or both of the stand 120 and the operation unit 130.

The platform 110 rotatably holds the wheels 111. In the example of FIG. 1, the platform 110 is provided with four wheels 111. The four wheels 111 are right and left front wheels, and right and left rear wheels. The mobile robot 100 moves along a desired route by independently controlling the rotational directions and the rotational speeds of the wheels 111. Part of the four wheels 111 may be drive wheels, and the rest of the wheels 111 may be driven wheels. As shown in FIG. 1, an additional driven wheel(s) may be provided between the front and rear wheels 111.

In order to, for example, prevent contact with obstacles and check the route, various sensors such as a camera and a distance sensor may be provided on at least one of the following components: the platform 110, the operation unit 130, and the stand 120.

FIG. 1 illustrates an example in which a camera 104 and a sensor 105 are provided as such sensors. The camera 104 faces the +X side on the stand 120, and the sensor 105 is provided on the front side of the platform 110. A bumper may be installed on the front side of the platform 110, and the sensor 105 may be mounted on the bumper. The sensor 105 detects that any object comes into contact with the bumper. The mobile robot 100 can be controlled to stop when the sensor 105 detects contact of any object, that is, any obstacle. Therefore, the sensor 105 can be referred to as "stop sensor". The sensor 105 need not necessarily be mounted on the front side. The sensor 105 may be a sensor that detects contact of any object with a bumper installed on part or all of the outer periphery of the mobile robot 100. The sensor 105 may be configured to also detect the contact position of the object on the bumper.

The mobile robot 100 is an autonomous mobile robot. However, the mobile robot 100 has a function to move according to user's operations. That is, the mobile robot 100 is a mobile robot configured to switch between the autonomous mode and the user operation mode. By controlling the autonomous movement, the mobile robot 100 can move autonomously based on a route determined according to a set transport destination or a set route. In the control for autonomous movement, the mobile robot 100 can be autonomously moved by determining a route or avoiding contact using a learning model obtained through machine learning.

The user operation mode in which the mobile robot 100 moves based on user operations may be any mode as long as the degree of involvement of the user operations is relatively high compared to the autonomous mode in which the mobile robot 100 moves autonomously. In other words, the user operation mode need not be limited to a mode in which the user controls all movements of the mobile robot with no autonomous control by the mobile robot. Similarly, the autonomous mode need not be limited to a mode in which the mobile robot performs fully autonomous control and does not accept any user operations. For example, the user operation mode and the autonomous mode may include the following first to third examples.

In the first example, the autonomous mode is a mode in which the mobile robot travels autonomously and determines when to stop and when to start traveling and the user does not perform any operations, and the user operation mode is a mode in which the mobile robot travels autonomously and the user operates to stop the mobile robot and to control the mobile robot to start traveling. In the second example, the autonomous mode is a mode in which the mobile robot travels autonomously and the user operates to stop the mobile robot and to control the mobile robot to start traveling, and the user operation mode is a mode in which the mobile robot does not travel autonomously and the user not only operates to stop the mobile robot and to control the mobile robot to start traveling but also operates to control the mobile robot to travel. In the third example, the autonomous mode is a mode in which the mobile robot travels autonomously and determines when to stop and when to start traveling and the user does not perform any operations, and the user operation mode is a mode in which the mobile robot travels autonomously for speed adjustment, contact avoidance, etc. and the user operates to change the direction of travel and the route etc.

For example, the user may be a worker at a facility where the mobile robot 100 is utilized. When the facility is a hospital, the user may be a hospital worker.

The control computer 101 can be implemented by, for example, integrated circuitry, and can be implemented by, for example, a processor such as a micro processor unit (MPU) or a central processing unit (CPU), a working memory, and a nonvolatile storage device. Control programs to be executed by the processor are stored in the storage device, and the processor can perform the function to control the mobile robot 100 by reading the programs into the working memory and executing them. The control computer 101 can be referred to as "control unit".

The control computer 101 controls the mobile robot 100 to move autonomously toward a preset transport destination or along a preset transport route, based on prestored map data and information acquired by the various sensors such as the camera 104. This autonomous movement control can include control for loading a wagon 500 shown in FIG. 2 and control for unloading the wagon 500. The wagon 500 will be described later. It can be said that the control computer 101 includes a movement control unit that performs such autonomous movement control.

In order to load and unload an object such as the wagon 500, the platform 110 may include a lifting mechanism 140 for loading and unloading an object. Part of the lifting mechanism 140 can be housed inside the platform 110. The lifting mechanism 140 can be installed on the upper surface side of the platform 110 with its loading surface, namely its surface on which an object to be transported is to be loaded, being exposed. The lifting mechanism 140 is a lifting stage configured to be raised and lowered, and can be raised and lowered as controlled by the control computer 101. The platform 110 is provided with a motor and a guide mechanism for the raising and lowering of the lifting mechanism 140. An upper surface of the lifting mechanism 140 serves as the loading surface on which the wagon 500 as an object to be transported is to be loaded. The wagon 500 is not limited to the configuration shown in FIG. 2, and may be any predetermined wagon of a size, shape, and weight that is loadable and transportable on the lifting mechanism 140. The lifting mechanism 140 includes a lift mechanism for lifting the wagon 500. Space above the lifting mechanism 140 serves as a loading space for loading an object to be transported. As far as the user loads the wagon 500, the platform 110 need not include the lifting mechanism 140.

The platform 110 may include a first light-emitting unit 11 positioned to surround the lifting mechanism 140. The first light-emitting unit 11 only needs to emit light for notification, and can be composed of, for example, one or more light-emitting diodes (LEDs) or organic electroluminescence. The light emission can be controlled by the control computer 101. The position, shape, and size of the first light-emitting unit 11 are not limited to those illustrated in the drawings. The mobile robot 100 may include the first light-emitting unit 11 even when the mobile robot 100 does not include the lifting mechanism 140. The first light-emitting unit 11 and a second light-emitting unit 12 described later are given prefixes "first" and "second" only for distinction therebetween. The mobile robot 100 need not include either or both of the first light-emitting unit 11 and the second light-emitting unit 12.

The stand 120 is attached to the platform 110. The stand 120 is a rod-shaped member extending upward from the platform 110. While the stand 120 is formed in the shape of a circular column with its longitudinal direction corresponding to the Z direction, the stand 120 may have any shape, or the mobile robot 100 need not include the stand 120. The longitudinal direction of the stand 120 is parallel to the Z direction. The stand 120 is disposed outside the lifting mechanism 140. That is, the stand 120 is disposed so as not to interfere with the lifting operation of the lifting mechanism 140. The stand 120 is disposed on one end side of the platform 110 in the Y direction (right-left direction). The stand 120 is attached near the front right corner of the platform 110. The stand 120 is provided at an end of the platform 110 on the +X side and the −Y side in the XY plane.

The stand 120 may include, for example, a stick portion 131 of a joystick device or an emergency stop button for emergency stop of the mobile robot 100 on its upper surface. The joystick device is a device that is operated to move the mobile robot 100 in a direction intended by the user in the user operation mode. The stick portion 131 can be gripped by a hand of the user, and therefore can be referred to as "grip portion". The joystick device can receive a directional operation when the user tilts the stick portion 131 in a direction in which the user wants the mobile robot 100 to move. The joystick device can be controlled such that a switching operation to switch between the autonomous mode and the user operation mode is performed by depressing the stick portion 131 downward. Alternatively, the joystick device can be controlled such that a determination operation is performed by depressing the stick portion 131 downward. The stick portion 131 can be configured to function as an emergency stop button by depressing the stick portion 131 downward for a predetermined period. When the stick portion 131 is configured to receive two or more of the switching operation, the determination operation, and the emergency stop operation, this predetermined period may be varied among such operations. The shape and size of the joystick device are not limited to those illustrated.

The stand 120 may include the second light-emitting unit 12 positioned to surround the stick portion 131. The second light-emitting unit 12 only needs to emit light for notification, and can be composed of, for example, one or more LEDs or organic electroluminescence. The light emission can be controlled by the control computer 101. The position, shape, and size of the second light-emitting unit 12 are not limited to those illustrated in the drawings. The mobile robot 100 can include the second light-emitting unit 12 also when the stand 120 is not provided or when the stand 120 is provided but the stick portion 131 is not provided.

The stand 120 supports the operation unit 130. The operation unit 130 is attached near an upper end of the stand 120. Thus, the operation unit 130 can be installed at a height at which the operation unit 130 is easily operable by the user. That is, the stand 120 extends to a height at which the standing user can perform operations easily, and the stick portion 131 is also disposed at a height at which the stick portion 131 is easily operable by the user. The operation unit 130 extends to the +Y side from the stand 120. From the viewpoint of easy operability, the operation unit 130 can be disposed at the center of the platform 110 in the right-left direction.

The operation unit 130 can include a touch panel monitor etc. that receives operations by the user. In this case, the operation unit 130 can display a user interface image such as a graphical user interface (GUI) image on a screen, and can receive a touch operation on the touch panel as a user operation. The operation unit 130 can include a microphone etc. for audio input. The monitor of the operation unit 130 is oriented opposite to the platform 110. That is, a display surface (operation surface) of the operation unit 130 is a surface on the +X side. The operation unit 130 may be detachable from the stand 120. That is, a holder that holds the touch panel may be attached to the stand 120. The user can input or change a transport destination for an object to be transported, transport information about the object to be transported, etc. by operating the operation unit 130. The operation unit 130 can display, to the user, information such as details of an object being transported or an object to be transported, a destination of the object, and a transport route, and receive changes in the destination and the transport route. The operation unit 130 can receive a movement operation on the mobile robot 100 similarly to the joystick device. The mobile robot 100 need not include the operation unit 130. Also in that case, the mobile robot 100 is configured such that user operations can be performed. For example, the mobile robot 100 can include an operation device that receives user operations as exemplified by the joystick device including the stick portion 131. The mobile robot 100 can be connected to an operation device that performs remote operation.

As illustrated in the drawings, the operation unit 130 and the stick portion 131 can be disposed at least about the same height so that operations can be performed intuitively. Thus, the user can perform operations intuitively even when an operation to depress the stick portion 131 is assigned to an operation to determine details of an operation displayed on the operation unit 130.

An integrated circuit (IC) card reader for the user to get authenticated using an IC card etc. may be installed on the stand 120 at about the same height position as that of the operation unit 130 or inside the operation unit 130. With the user authentication function, the mobile robot 100 can block mischievous operations by a third party etc., that is, limit operations by a third party. This operation limitation will be described later. The user authentication function is not limited to the authentication using the IC card, and may be implemented by authentication with electronic identification (ID) using a mobile terminal device such as a smartphone, or by a sensor for reading information, such as a reader for biometric authentication. The authentication with electronic ID may be performed using various short-range wireless communication technologies that allow contactless transmission and reception of information, thereby reducing user's trouble and preventing infection. Various authentication methods can be adopted as the biometric authentication, such as fingerprint authentication, finger vein authentication, iris authentication, and voiceprint authentication. Regarding the biometric authentication as well, it is possible to reduce user's trouble and prevent infection by reading biometric information without contact.

The user can place an object to be transported in the wagon 500 loaded on the mobile robot 100 described above, and request the mobile robot 100 to transport the object. The wagon 500 itself can also be referred to as "object to be transported". Therefore, for convenience, the object to be transported in the wagon 500 will be referred to as "article" for distinction in the following description. The mobile robot 100 autonomously moves to a set destination to transport the wagon 500. That is, the mobile robot 100 executes a task of transporting the wagon 500. In the following description, a location at which the wagon 500 is loaded will be referred to as "transport origin" or "loading location", and a location to which the wagon 500 is delivered will be referred to as "transport destination" or "destination".

For example, it is assumed that the mobile robot 100 moves in a general hospital with a plurality of clinical departments. The mobile robot 100 transports articles such as supplies, consumables, and medical instruments among the clinical departments. For example, the mobile robot 100 delivers articles from a nurse station of a certain clinical department to a nurse station of another clinical department. Alternatively, the mobile robot 100 delivers articles from a storage for supplies and medical instruments to a nurse station of a clinical department. The mobile robot 100 also delivers medicine dispensed in a dispensing department to a clinical department or a patient expected to use the medicine.

Examples of the articles include drugs, consumables such as bandages, specimens, inspection instruments, medical instruments, hospital diets, and supplies such as stationery. Examples of the medical instruments include sphygmomanometers, blood transfusion pumps, syringe pumps, foot pumps, nurse call buttons, bed leaving sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, and echo machines. Meals such as hospital diets and inspection diets may also be transported. The mobile robot 100 may further transport instruments that have been used, tableware that has been used, etc. When the transport destination is on a different floor, the mobile robot 100 may move using an elevator etc.

Figure 3:
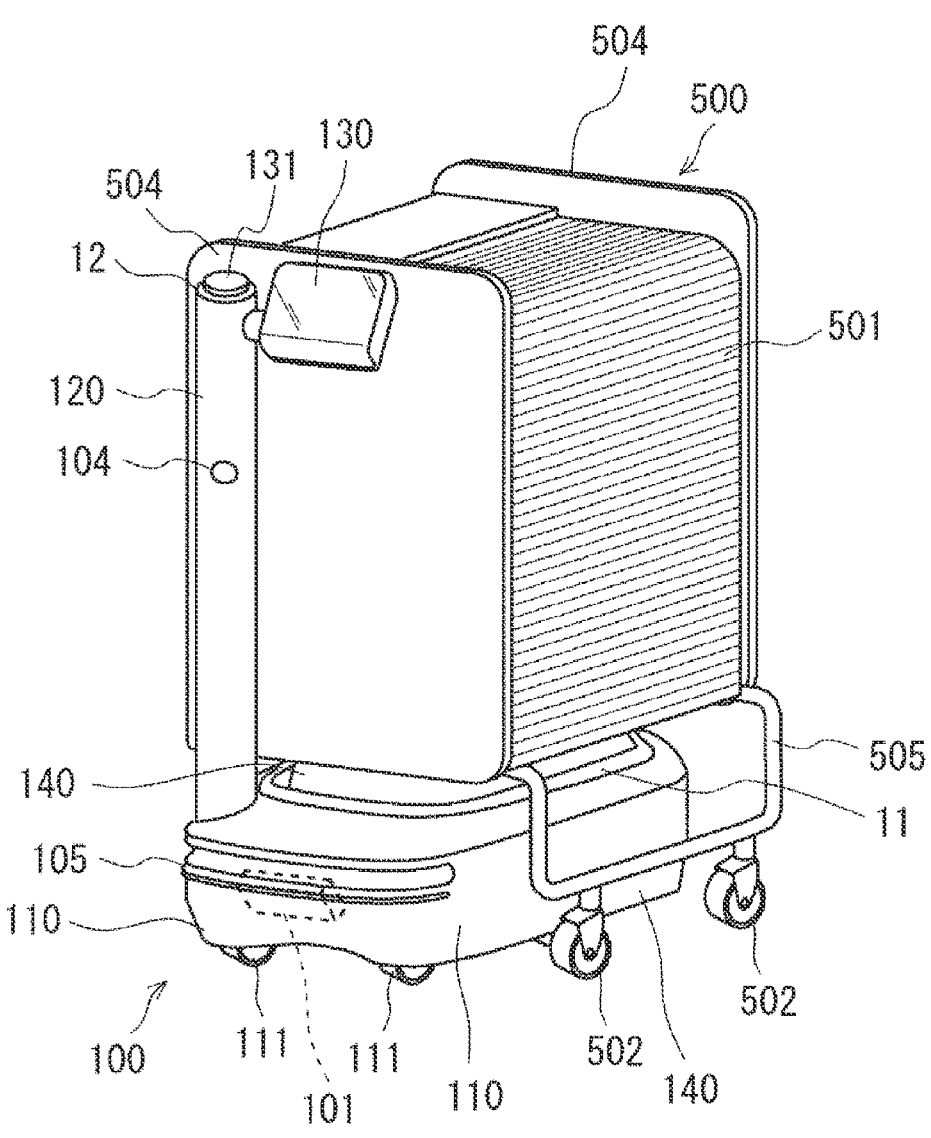
FIG. 3 is a perspective view showing how the mobile robot in FIG. 1 transports the wagon in FIG. 2.
Figure 3:
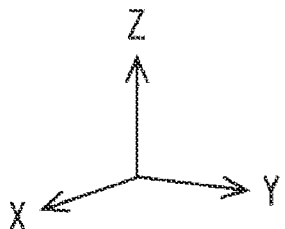

Next, the details of the wagon 500 and an example of how the mobile robot 100 holds the wagon 500 will be described with reference to FIGS. 2 and 3. FIG. 3 is a perspective view showing how the mobile robot 100 transports the wagon 500.

The wagon 500 includes a housing portion that houses an article, and a support portion that supports the housing portion with a space secured under the housing portion to allow insertion of at least part of the platform 110. As shown in FIG. 2, the housing portion can include side plates 504 on both sides of the wagon 500 and an openable cover 501. When the user opens the cover 501, the article housed inside the wagon 500 can be unloaded. As illustrated in FIG. 2, the support portion can include support frames 505 that support the housing portion, and wheels 502 attached under the support frames 505. The wheels 502 can include covers (not shown).

The wagon 500 can be held by the lifting mechanism 140 of the mobile robot 100 as described above. The lifting mechanism 140 is a mechanism that loads and unloads the wagon 500 as an object to be transport on and off the upper surface side of at least part of the platform 110. The mobile robot 100 can automatically transport the wagon 500 easily by including the lifting mechanism 140.

As illustrated in FIG. 3, the mobile robot 100 can hold the wagon 500 using the lifting mechanism 140. The space to allow insertion of at least part of the platform 110 is a space S secured under the wagon 500 shown in FIG. 2. The space S allows insertion of the platform 110. That is, the platform 110 can be inserted into the space S directly under the wagon 500. When the wagon 500 is loaded on the platform 110, the mobile robot 100 moves in the −X direction and is inserted into the space directly under the wagon 500. The platform 110 is inserted into the space directly under the wagon 500 from the side on which the stand 120 is not provided in the front-rear direction. In this manner, the wagon 500 can be loaded without the stand 120 interfering with the wagon 500. In other words, the stand 120 can be attached near the corner of the platform 110 so as not to interfere with the wagon 500.

The loading surface of the lifting mechanism 140 can have recesses 141 as shown in FIG. 1. Projections (not shown) can be provided on the lower side of the housing portion of the wagon 500. The wagon 500 can be fixed to the mobile robot 100 by fitting the projections to the recesses 141.

While the wagon 500 is illustrated as a cart that includes the wheels 502, the shape and configuration of the wagon 500 are not particularly limited. It is only necessary that the predetermined wagon exemplified by the wagon 500 have a shape, size, and weight that enable the wagon to be transported by the mobile robot 100.

Operations of the mobile robot 100 to load the wagon 500, transport the wagon 500 to a transport destination, and unload the wagon 500 will be described. First, to load the wagon 500, the mobile robot 100 can be determined as a mobile robot that is set in advance to transport the wagon 500 and that moves in search of the wagon 500 or to an existing position. For example, the wagon 500 whose position is specified by the user may be specified as a target to be transported or a target of search, and the mobile robot 100 may autonomously move to transport the wagon 500. Alternatively, the mobile robot 100 may automatically transport the wagon 500 to a transport destination when the wagon 500 is found on the way back after finishing a transport task of transporting a different wagon or an article etc. These examples are not limiting, and various methods can be applied as the method of operation for the mobile robot 100 to transport the wagon 500.

The mobile robot 100 moves to the position of the wagon 500, and the control computer 101 performs control to recognize the wagon 500 based on information acquired by the camera 104 or another sensor and load the wagon 500 using the lifting mechanism 140. This control for the loading can also be referred to as "pick-up control".

In the pick-up control, the platform 110 is first inserted into the space S directly under the wagon 500, and the lifting mechanism 140 is raised when the insertion is completed. Thus, the lifting mechanism 140 can lift the wagon 500 with the lifting stage as the upper surface of the lifting mechanism 140 in contact with the wagon 500. That is, when the lifting mechanism 140 is raised, the wagon 500 is loaded on the platform 110 with the wheels 502 brought off the ground. This renders the mobile robot 100 ready to dock with the wagon 500 and move toward the transport destination. Next, the wagon 500 is transported to the transport destination by the control computer 101 controlling drive of the wheels 111 etc. to autonomously move along a set route.

The mobile robot 100 moves to the transport destination for the wagon 500, and the control computer 101 performs control to unload the wagon 500 using the lifting mechanism 140. In this control, the lifting mechanism 140 is lowered to unload the wagon 500 from the platform 110. The wheels 502 are brought into contact with the floor surface, and the upper surface of the lifting mechanism 140 is brought off the wagon 500. The wagon 500 is placed on the floor surface. The wagon 500 can be unloaded from the platform 110.

The above various examples have been described on the assumption that the mobile robot 100 transports a wagon such as the wagon 500 as an object to be transported. However, the mobile robot 100 may transport an individual article (load) as an object to be transported during operation even if the mobile robot 100 is configured to transport a wagon. In that case, a housing box, a shelf, etc. that does not allow the article to fall during movement is preferably attached to the mobile robot 100.

In operation, there may be a scene in which the mobile robot 100 transports a plurality of articles and it is necessary to transport the articles to a plurality of transport destinations. In this case, the user can unload the articles at the transport destinations irrespective of whether the wagon 500 is used for transport. The mobile robot 100 can move autonomously or according to user operations to a set destination and transport the wagon or the individual articles.

Figure 4:
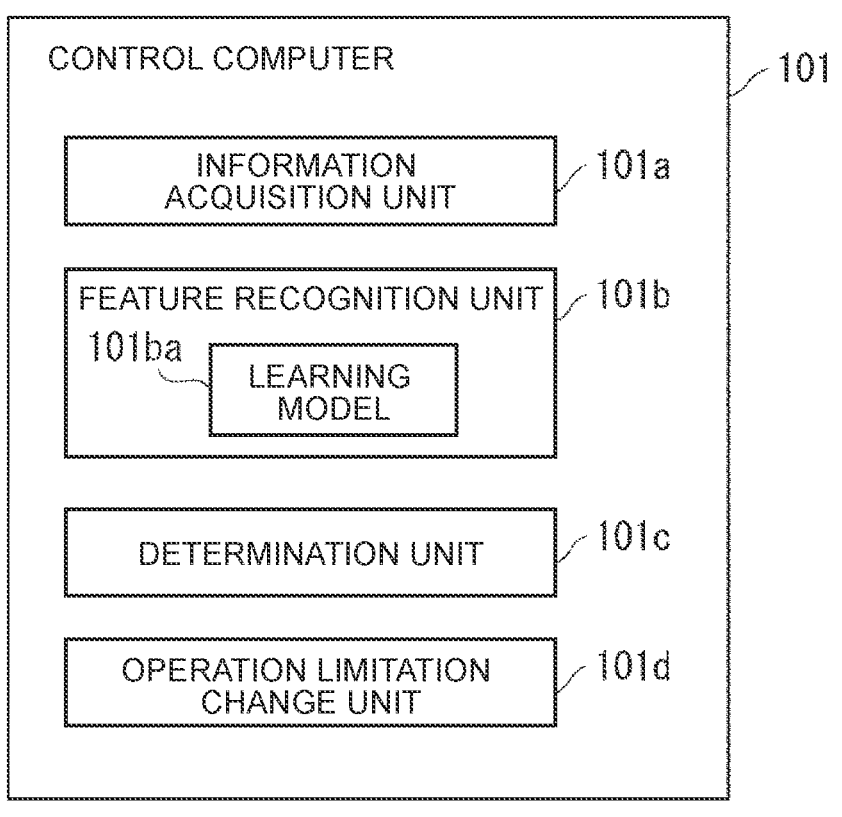
FIG. 4 is a block diagram showing an example of the configuration of a control computer of the mobile robot in FIG. 1.

Next, an example of main features of the present embodiment will be described with reference to FIGS. 4 and 5. FIG. 4 is a block diagram showing an example of the configuration of the control computer 101 of the mobile robot 100. FIG. 5 is a diagram showing an example of classification into non-staff persons and staff members determined by the control computer 101 in FIG. 4.

In the present embodiment, the mobile robot 100 includes an operation unit for operating the mobile robot 100 as exemplified by the joystick device or the operation unit 130, that is, an operation interface for operating the mobile robot 100.

The control computer 101 performs the following change control as at least part of the system control described above. This change control is control to recognize the feature of a mobile body present around the operation interface for operating the mobile robot 100 and change the operation limitation on the operation interface when the recognized feature satisfies a predetermined condition. For example, it is appropriate that the control computer 101 perform control to impose the operation limitation on the operation interface when the mobile body recognized as having approached the operation interface is a person who is obviously expected to make an erroneous operation.

For example, the operation interface includes at least one of an interface such as a GUI image to be displayed on a display device installed on the mobile robot 100, a joystick device installed on the mobile robot 100, and a remote operation device for remotely operating the mobile robot 100. The display device can be exemplified by a display unit provided in the operation unit 130, and the joystick device can be exemplified by the joystick device including the stick portion 131.

In the following, an example will be given in which the operation interface includes the joystick device and the operation unit 130. As described above, the operation interface may be any interface that allows user operations related to the control on the mobile robot 100. For example, it may be an interface that receives operations to move the mobile robot 100 in the user operation mode. The operation interface may be configured to receive a switching operation between the autonomous mode and the user operation mode and, as described above, may be configured to receive part of the user operations such as the switching operation even in the autonomous mode.

The mobile body includes a person, and can also include any other mobile robot of the same type and any other mobile robot of a different type. Whether the mobile body is present around the joystick device and the operation unit 130 can be determined by the control computer 101 based on, for example, data on an image captured by the camera 104 or a camera (not shown) mounted on the operation unit 130 or the joystick device (hereinafter referred to as "operation unit camera"). For example, when the control computer 101 analyzes the image data and can recognize that the mobile body has a face and that the face is equal to or larger than a predetermined size, the control computer 101 can determine that the mobile body is present around the joystick device and the operation unit 130.

Alternatively, the control computer 101 may adopt a configuration in which the mobile robot 100 can be connected to an environmental camera (not shown) installed inside a facility. In such a configuration, determination can be made as to whether the mobile body is present around the joystick device and the operation unit 130 based on data on an image captured by the environmental camera. For example, when the control computer 101 analyzes the image data and can recognize both a mobile body with a face and the mobile robot 100 and recognize that the distance between the mobile body and the mobile robot 100 is equal to or shorter than a predetermined distance, the control computer 101 can determine that the mobile body is present around the joystick device and the operation unit 130.

Alternatively, the mobile robot 100 may have the user authentication function as exemplified by the IC card reader, and the control computer 101 may determine whether the mobile body is present around the joystick device and the operation unit 130 based on user information obtained by the user authentication function. That is, the control computer 101 can determine that the mobile body is present around the joystick device and the operation unit 130 when the user authentication function is used, and can determine that the mobile body is not present around the joystick device and the operation unit 130 when the user authentication function is not used. The control computer 101 can also determine whether the user is a preregistered staff member or not (i.e., a non-staff person) by obtaining the result of the user authentication.

When determination is made about the presence of the mobile body using image data, the feature of the mobile body can refer to the size of the mobile body, the attribute of the mobile body, etc. The attribute may be, for example, an attribute indicating a child or a person other than a child, or an attribute indicating a staff member or a non-staff person. When determination is made about the presence of the mobile body using the user authentication function, the feature of the mobile body can be, for example, an attribute indicating a registered staff member or a non-staff person.

With this configuration, the mobile robot 100 can change the operation limitation depending on the mobile body recognized around the joystick device and the operation unit 130. Therefore, the safety for the surroundings of the mobile robot 100 to be operated can be prevented from varying depending on the operator, thereby improving the safety. Such an effect is obtained for the operation interface mounted on the mobile robot 100.

For the above change control, the control computer 101 can include, for example, as shown in FIG. 4, an information acquisition unit 101a, a feature recognition unit 101b, a determination unit 101c, and an operation limitation change unit 101d.

The information acquisition unit 101a acquires processing target information that is information to be processed. The information acquisition unit can acquire image data as the processing target information as described above, and can be referred to as "image data acquisition unit". Although the following description is given on the assumption that image data is acquired as the processing target information, the information acquisition unit 101a may be configured to acquire processing target information detected by a sensor other than the image data, as exemplified by user information obtained by the user authentication function.

The information acquisition unit 101a acquires image data on an image captured by a camera. Various cameras such as those described above can be used as the camera. The image data may be data on an image captured by the camera, or data obtained by processing the image data. For example, the image data may be feature amount data extracted from the image data. Information such as an imaging time and an imaging location may be added to the image data. The information acquisition unit 101a may acquire pieces of image data from a plurality of cameras.

The feature recognition unit 101b recognizes the feature of a mobile body present around the joystick device and the operation unit 130 based on the image data acquired by the information acquisition unit 101a. The feature recognition unit 101b can recognize the mobile body by extracting its feature from the image data and comparing the extracted feature with a predetermined feature. Therefore, the feature recognition unit 101b can also be referred to as "feature extraction unit".

More specifically, the feature recognition unit 101b detects a mobile body in the image data by performing image processing on the image data. Then, the feature recognition unit 101b extracts the feature of the mobile body such as a person in the image data. An arithmetic processing unit (not shown) provided in the camera for acquiring the image data may perform at least part of the process for extracting the feature amount. As means for detecting that a mobile body such as a person is included in image data, various technologies such as machine learning including a feature amount in Histograms of Oriented Gradients (HOG)

and convolution processing are known to those skilled in the art. Therefore, detailed description thereof will be omitted here.

An example will be given in which a condition that the mobile body present in the vicinity is a non-staff person is adopted as the predetermined condition. In this case, the feature recognition unit 101*b* detects, for example, a color of clothing of the detected mobile body to distinguish a staff member and a non-staff person. More specifically, for example, the feature recognition unit 101*b* can calculate the ratio of the area of a specific color based on the clothing of the detected mobile body or actually based on clothing of a person detected due to the presence of the clothing. Alternatively, the feature recognition unit 101*b* detects the color of the clothing in a specific part based on the clothing of the detected person.

In this way, the feature recognition unit 101*b* can extract a characteristic portion of the clothing of the staff member and, when it can be extracted, can recognize that the feature indicates the staff member. When the characteristic portion of the clothing of the staff member cannot be extracted, the feature recognition unit 101*b* can recognize that the feature indicates a non-staff person.

Whether the clothing is the clothing of the staff member or the clothing of the non-staff person can be determined as follows. When a color of clothing of a "pharmacist" or "nurse" exemplified in FIG. 5 is detected, determination is made that the clothing is the clothing of the staff member. When such a clothing color cannot be detected, determination is made that the clothing is the clothing of the non-staff person. In actuality, staff members in a hospital wear uniforms in different colors and shapes for individual categories such as pharmacists and nurses. Therefore, it is possible to recognize whether the person is the staff member. The feature is not limited to the color of the clothing, and a characteristic shape of the clothing of the staff member or a characteristic accessory or other belongings, such as the shape of the clothing or a cap, may also be extracted as the feature. The staff members can include any other mobile robot that moves inside the facility. In that case, the feature of the shape may be extracted rather than the feature of the clothing.

The feature recognition unit 101*b* may extract a feature of a face image of the mobile body present in the vicinity. That is, the feature recognition unit 101*b* may extract a feature for face recognition and compare it with a preregistered facial feature to recognize a person.

The feature recognition unit 101*b* can include a learning model 101*ba* that is a trained model. Specifically, the feature recognition unit 101*b* may recognize the feature using the learning model 101*ba* that receives an image obtained by imaging the surroundings of the joystick device and the operation unit 130 and outputs the feature. In this case, images captured for the respective staff categories can be used for the machine learning as supervisory data. That is, a machine learning model with high recognition accuracy can be constructed by performing supervised learning using, as supervisory data, image data with a staff category as a correct answer label. That is, a captured image of the staff member wearing a predetermined uniform can be used as learning data. The algorithm of the learning model 101*ba* etc. is not limited. In this way, the feature recognition unit 101*b* can perform feature recognition with high accuracy by constructing the highly accurate learning model 101*ba*.

Regardless of the feature recognition method, the feature recognition unit 101*b* supplies the recognized feature to the determination unit 101*c*. Even when processing target information other than image data is acquired, a feature associated with the acquired processing target information (e.g., information on a staff member or a non-staff person in the case of the user authentication function) can be obtained.

The determination unit 101*c* determines whether the recognized feature satisfies the predetermined condition. In the case where the condition that the mobile body present in the vicinity is a non-staff person is adopted as the predetermined condition as in the above example, determination is made that the predetermined condition is satisfied when the recognized feature does not indicate the staff member.

The determination unit 101*c* may determine whether the feature satisfies the predetermined condition using a learning model (not shown) that receives the feature and outputs information indicating whether the feature satisfies the predetermined condition. The algorithm of this learning model etc. is not limited. In this way, the determination unit 101*c* can accurately determine whether the predetermined condition is satisfied by constructing a highly accurate learning model.

Regardless of the determination method used to perform the determination, when the predetermined condition is satisfied, the determination unit 101*c* supplies, to the operation limitation change unit 101*d*, information indicating that the predetermined condition is satisfied. When the predetermined condition is not satisfied, the determination unit 101*c* does not supply the information or supplies, to the operation limitation change unit 101*d*, information indicating that the predetermined condition is not satisfied.

In the configuration example of FIG. 4, the feature recognition unit 101*b* and the determination unit 101*c* are distinguished, but the function of the feature recognition unit 101*b* may be included in the determination unit 101*c*. Even in that case, the learning model (not shown) can be used to obtain a result as to whether the predetermined condition is satisfied. This learning model may be any learning model that receives an image obtained by imaging the surroundings of the joystick device and the operation unit 130 and outputs information indicating whether the image satisfies the predetermined condition. The algorithm etc. is not limited. The determination unit 101*c* may use such a learning model to determine whether the feature satisfies the predetermined condition. In this way, the determination unit 101*c* can accurately determine whether the predetermined condition is satisfied by constructing a highly accurate learning model.

In either of the case where the information acquisition unit 101*a* acquires image data and the case where the information acquisition unit 101*a* acquires processing target information other than image data, the determination unit 101*c* may regard the area where the processing target information has been acquired as the feature of the mobile body and determine whether the predetermined condition is satisfied based on the feature.

Specifically, in a facility where the mobile robot 100 is to be moved, area categories may be set in map data of the facility, and the feature recognition unit 101*b* may recognize the feature of the mobile body based on the category of the area where the processing target information has been acquired.

The areas can be categorized, for example, into a staff-only area, an area for special staff members permitted to handle drugs, and a children's area where children are likely to be present. Examples of areas other than the staff-only area include an area where patients are mixed, such as a waiting room or a corridor in front of an examination room, and a childcare room. Examples of the children's area include a childcare room. By identifying the category of the area where the mobile robot 100 is present, the feature recognition unit 101*b* can be deemed to have identified, that is, recognized the feature of the mobile body in the vicinity. For example, when the area where the mobile robot 100 is present is the staff-only area, the area for special staff members, or the children's area, the feature recognition unit 101*b* can recognize that the feature of the mobile body is a feature of a staff member, a feature of a special staff member, or a feature of a child. The determination unit 101*c* can determine whether the predetermined condition is satisfied based on the recognized feature.

Particularly in a facility such as a hospital where many unspecified persons may be present, only the minimum feature of the mobile body, such as information indicating whether the mobile body is a staff member or a non-staff person, can be obtained based on user information obtained by the user authentication function. By combining the recognition of the feature of the mobile body based on the area category, in particular, by dividing the area into various categories, it is possible to recognize more features based on the processing target information in which many features cannot be recognized. The accuracy of recognition of the feature of the mobile body can be improved also when image data is used as the processing target information. When image data is used as the processing target information and, for example, area categories are not set in the map data, marks such as signboards and stickers indicating area categories are placed in various locations inside the facility, and are recognized based on the image data. Thus, the category can be identified, that is, the feature of the mobile body can be recognized.

The operation limitation change unit 101*d* changes the operation limitation on the joystick device and the operation unit 130 when the determination unit 101*c* determines that the predetermined condition is satisfied. The operation limitation can be changed, for example, by the operation limitation change unit 101*d* sending change instructions to the joystick device and the operation unit 130.

Figure 6:
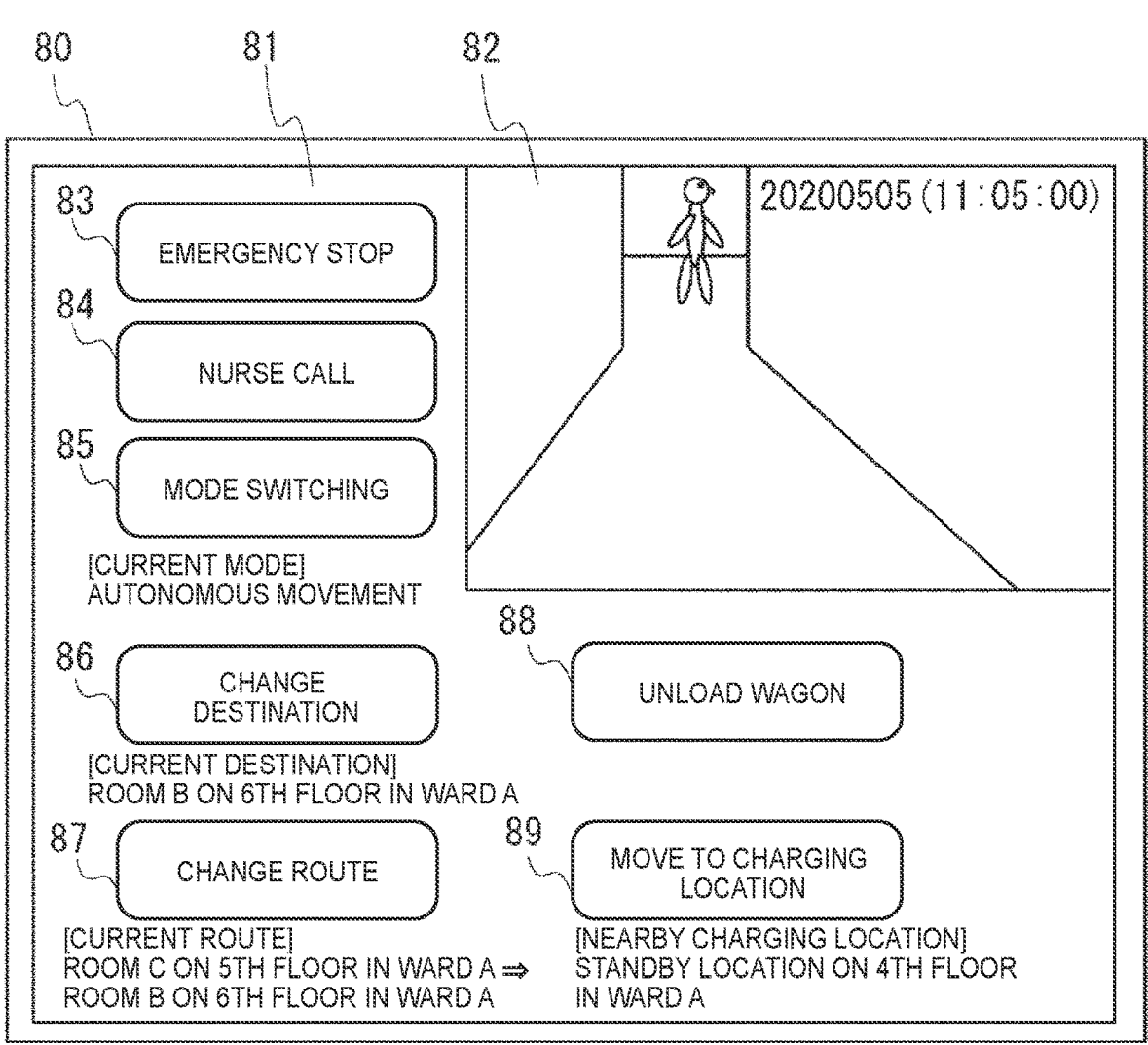
FIG. 6 is a diagram showing an example of a graphical user interface (GUI) image displayed on an operation unit under control of the control computer in FIG. 4.
Figure 7:
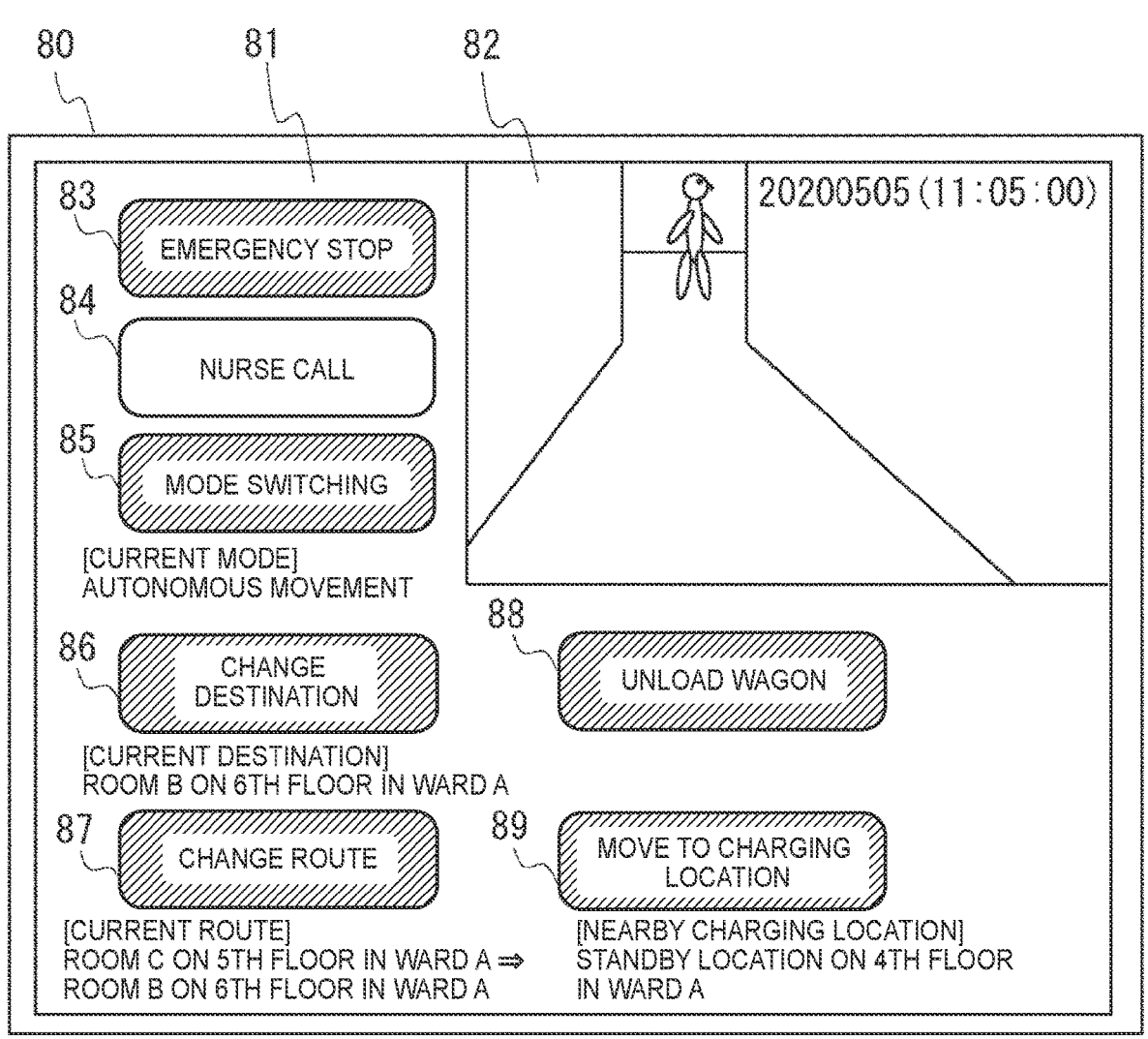
FIG. 7 is a diagram showing an example of a GUI image when operations on the GUI image in FIG. 6 are limited.
Figure 8:
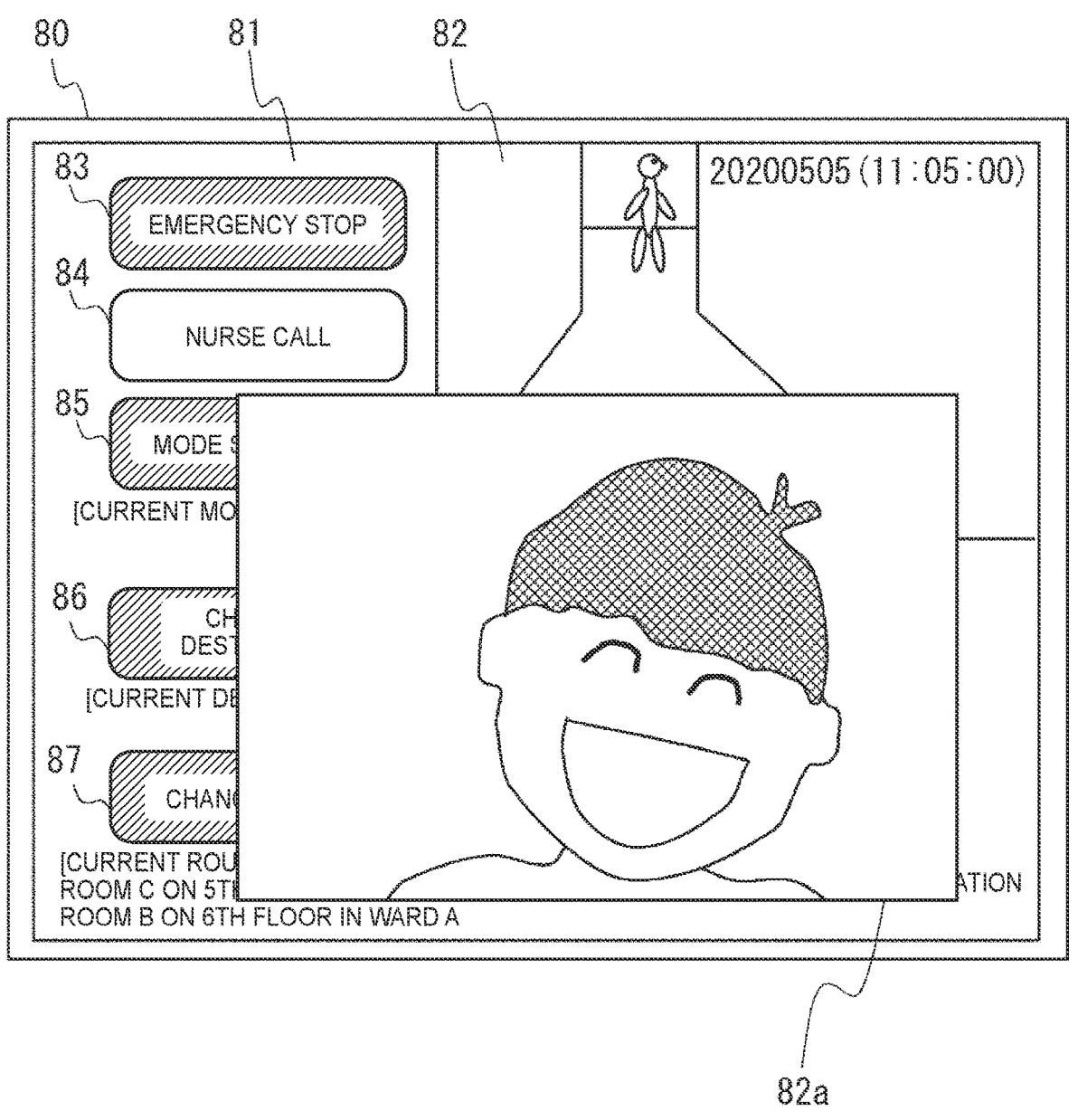
FIG. 8 is a diagram showing another example of the GUI image when the operations on the GUI image in FIG. 6 are limited.

Next, examples of the operation limitation will be described with reference to FIGS. 6 to 8. FIG. 6 is a diagram showing an example of a GUI image displayed on the operation unit 130 under control of the control computer 101 in FIG. 4. FIG. 7 is a diagram showing an example of a GUI image when operations on the GUI image in FIG. 6 are limited. FIG. 8 is a diagram showing another example of the GUI image when the operations on the GUI image in FIG. 6 are limited.

Regarding the predetermined condition, an example will be given in which the recognized feature is a feature indicating a non-staff person other than a staff member in a facility where the mobile robot 100 is operated. For example, the same process can be applied even when the predetermined condition is that the feature indicates a child, or that the feature indicates a child or a person with crutches. Further, the same process can be applied even when the predetermined condition is that the feature indicates a non-staff person, or that the feature indicates a child.

As the change control, the control computer 101 can perform control to impose the operation limitation on the joystick device and the operation unit 130 when the feature satisfies the predetermined condition.

With such control, in a case where an operator who may reduce safety if the joystick device and the operation unit 130 are operated is present near the joystick device and the operation unit 130, the operation limitation can be imposed compared to a case where an operator who can maintain safety if the joystick device and the operation unit 130 are operated is present near the joystick device and the operation unit 130. As in this example, the safety of people around the mobile robot 100 can be ensured by limiting operations by anyone other than the staff member of the facility where the mobile robot 100 is operated. Therefore, such control can prevent the safety from varying depending on the operator.

More specifically, the operation limitation may be limitation for prohibiting part or all of the operations on the joystick device and the operation unit 130. Therefore, the operations on the joystick device and the operation unit 130 can be prohibited when the predetermined condition is satisfied, thereby further preventing the safety from varying depending on the operator.

The operation limitation on the joystick device can be implemented, for example, by mechanically fixing the stick portion 131 so that it does not move.

The operation limitation on the operation unit 130 can be, for example, limitation for disabling reception of part or all of the operations on the operation screen. Regarding such limitations, an example shown in FIG. 6 will be given in which a display unit 80 provided in the operation unit 130 displays an operation image 81 and a camera image 82 that is being captured by the camera 104 as the GUI image before the operation limitation is imposed. In the operation image 81 in this example, an emergency stop button 83, a nurse call button 84, a mode switching button 85, a destination change button 86, a route change button 87, a wagon unloading button 88, and a "move to charging location" button 89 are displayed in a selectable manner.

The emergency stop button 83 is a button for emergency stop of the mobile robot 100. When it is selected, the control computer 101 controls the mobile robot 100 to stop in an emergency. The nurse call button 84 is a button for calling a nurse. When it is selected, the control computer 101 performs control to notify a preregistered notification destination about the call by wireless communication. The mode switching button 85 is a button for switching between the autonomous mode and the user operation mode. When it is selected, the control computer 101 switches the current mode to another mode.

The destination change button 86 is a button for changing the destination. When it is selected, the control computer 101 switches the image to an image for selection of destinations to be changed. When any destination is selected, the control computer 101 changes the destination to the selected destination. The route change button 87 is a button for changing the transport route. When it is selected, the control computer 101 switches the image to an image for selection of transport routes. When any transport route is selected, the control computer 101 changes the transport route to the selected transport route. The wagon unloading button 88 is a button for unloading the wagon 500. When it is selected, the control computer 101 controls the lifting mechanism 140 etc. to unload the wagon 500. The "move to charging location" button 89 is a button for moving the mobile robot 100 to a charging location. When it is selected, the control computer 101 changes the destination or relay location to, for example, the nearest charging location.

When the operation limitation is imposed on the operation image 81, the control computer 101 can, for example, disable selection of the buttons other than the nurse call button 84 as shown in FIG. 7. The control computer 101 may leave some of the other buttons in a selectable state, or may bring all the buttons into a non-selectable state.

The operation limitation is not limited to the prohibition of operations. For example, the operation limitation may be limitation for giving difficulty to part or all of the operations on the joystick device and the operation unit 130. More specifically, difficulty can be given to the operations by displaying an alarm message as a pop-up image on the display unit 80, but the limitation to give difficulty to the operations is not limited to this. Therefore, difficulty can be given to the operations on the joystick device and the operation unit 130 when the predetermined condition is satisfied, thereby further preventing the safety from varying depending on the operator.

As part of the system control, the control computer 101 may perform notification change control to change at least one of the details of and the method for notification on the joystick device and the operation unit 130 when the feature satisfies the predetermined condition. The notification about the joystick device can be made, for example, by the second light-emitting unit 12. When the feature satisfies the predetermined condition, the light-emitting pattern of the second light-emitting unit 12 can be changed to emit light in conspicuous brightness or color. At this time, the light-emitting pattern of the first light-emitting unit 11 as well as the second light-emitting unit 12 can be changed. The notification about the operation unit 130 can be implemented by displaying a pop-up image of, for example, a message "Please do not operate." when the operations are limited. The notification change control may include control to output an alarm sound or an alarm voice message.

As part of the system control, the control computer 101 may perform display control to display, on the operation unit 130, a captured image of the mobile body such as a camera image 82a in FIG. 8 when the feature satisfies the predetermined condition. The camera image 82a can be an image captured by the camera provided in the operation unit 130. By displaying it as a pop-up image as shown in the figure, the person who attempts operation is shown on the display unit 80 as the camera image 82a, which causes hesitation in operation. At this time, as exemplified in FIG. 8, it is more effective to prohibit or give difficulty to the operations on part or all of the buttons as in the example of FIG. 7. The camera image 82a may be displayed in place of the camera image 82. The display control exemplified with the display of the camera image 82a may be performed in combination with the notification change control described above.

With such a configuration, the mobile robot 100 can perform at least one of the notification on the joystick device and the operation unit 130 and the display of the captured image of the mobile body when the predetermined condition is satisfied. With such control, in a case where an operator who may reduce safety if the joystick device and the operation unit 130 are operated is present near the joystick device and the operation unit 130, it is possible to suppress the operator's attempt to operate them. Therefore, it is possible to further prevent the safety from varying depending on the operator.

Although the example has been given in which the predetermined condition is that the mobile body present in the vicinity is a non-staff person, determination may be made as to whether the non-staff person is a child. Thus, different operation limitation methods can be adopted between the case where the non-staff person is a child and the case where the non-staff person is a person other than a child. Children can be distinguished from adults by making determination about their age or height.

For example, the operation limitation may be performed only for a predetermined period on the assumption that the predetermined condition is no longer satisfied after the predetermined period has elapsed. However, the operation limitation may be continued while continuing the determination until the predetermined condition is no longer satisfied.

As part of the system control, the control computer 101 may perform control to stop the mobile robot 100 when the predetermined condition is satisfied. When the predetermined condition is satisfied, not only the operation limitation change control but also the stop control on the mobile robot 100 is performed, thereby further improving the safety.

Figure 9:
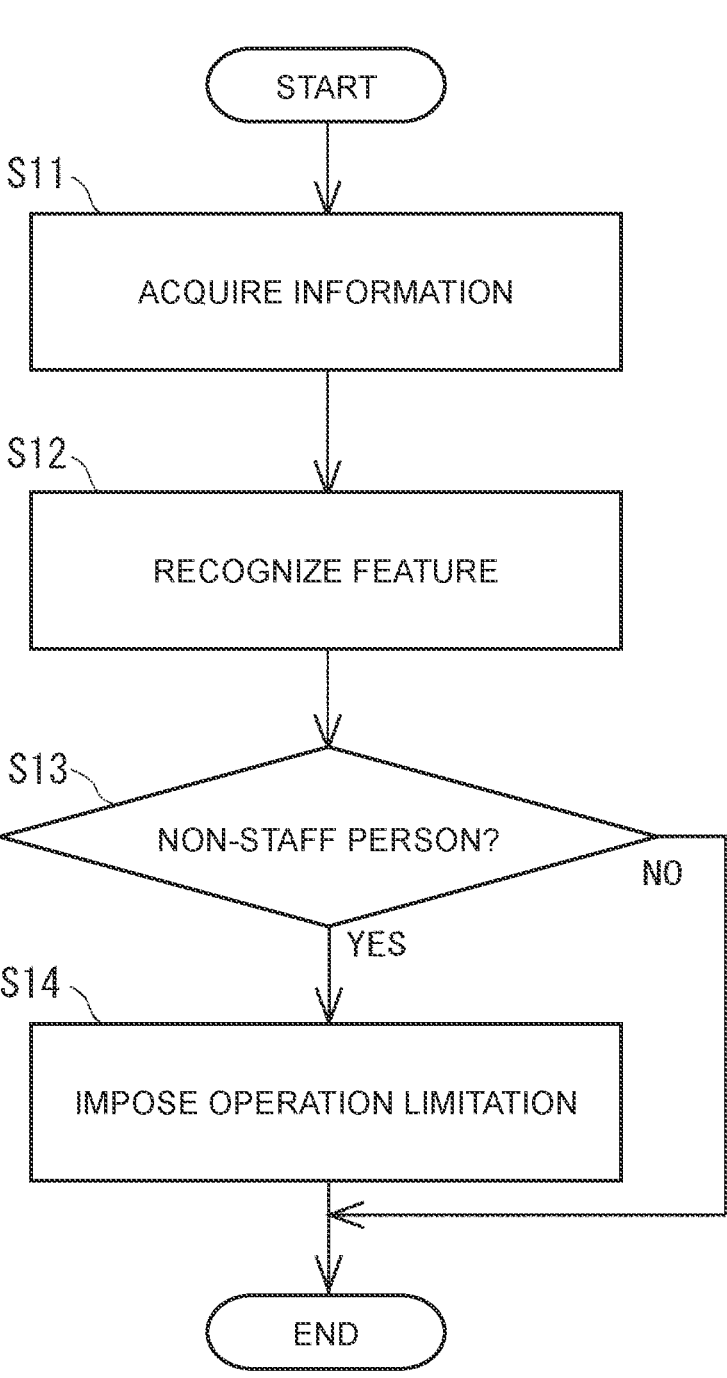
FIG. 9 is a flowchart illustrating an example of an operation limitation process that is performed by the control computer in FIG. 4.

Next, an example of a flow of the operation limitation process will be described with reference to FIG. 9. FIG. 9 is a flowchart illustrating an example of the operation limitation process that is performed by the control computer 101 in FIG. 4.

First, the control computer 101 acquires processing target information such as an image captured by the camera 104 or the camera (not shown) provided in the operation unit 130 to recognize the feature of a mobile body present around the operation unit 130 (step S11). Next, the control computer 101 recognizes the feature based on the acquired processing target information (step S12).

Next, the control computer 101 determines whether the recognized feature is a feature associated with a non-staff person (step S13). When the determination result is "YES", the control computer 101 transmits an instruction to impose operation limitation on the joystick device and the operation unit 130 (step S14), and terminates the process. When the determination result is "NO" in step S13, the control computer 101 terminates the process.

Figure 10:
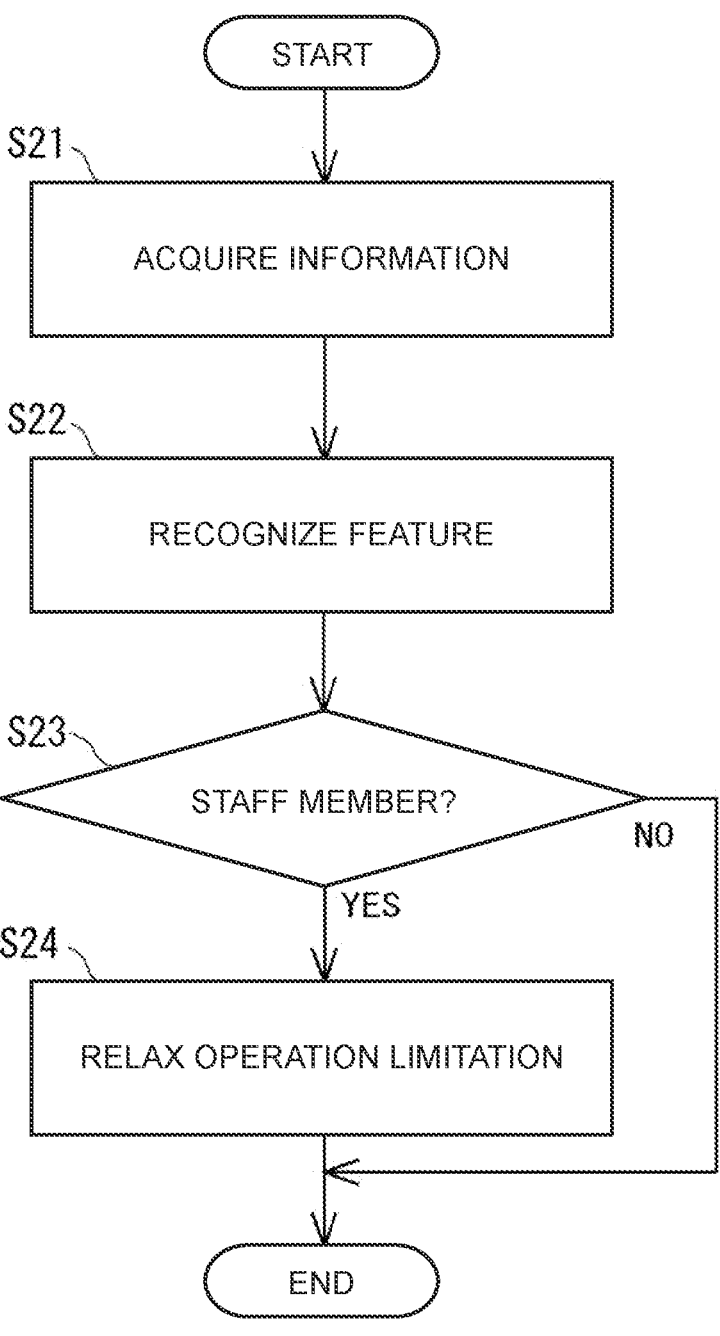
FIG. 10 is a flowchart illustrating another example of the operation limitation process that is performed by the control computer in FIG. 4.

Next, another example of the operation limitation process will be described with reference to FIG. 10. FIG. 10 is a flowchart illustrating another example of the operation limitation process that is performed by the control computer 101 in FIG. 4. The various examples described in FIGS. 1 to 8 can be applied to the example of FIG. 10 as well, except for differences from the example of FIG. 9.

As in steps S11, S12, the control computer 101 first acquires processing target information (step S21), and recognizes a feature based on the acquired processing target information (step S22).

Next, the control computer 101 determines whether the recognized feature is a feature associated with a staff member of a facility where the mobile robot 100 is operated (step S23). When the determination result is "YES" in step S23, the control computer 101 transmits an instruction to relax the operation limitation on the joystick device and the operation unit 130 (step S24), and terminates the process. When the determination result is "NO" in step S23, the control computer 101 terminates the process directly, that is, with the operation limitation still imposed.

As in the example of FIG. 10, the predetermined condition may be that the feature is a feature indicating a staff member. In this case, the change control is control to relax the operation limitation on the joystick device and the operation unit 130 when the feature satisfies the predetermined condition. In other words, such operation limitation is imposed before the change control. For example, the control computer 101 may cause the display unit 80 not to perform display on the operation unit 130 when the predetermined condition is not satisfied, and perform the display as shown in FIG. 6 when the predetermined condition is satisfied.

In this way, the control computer 101 can impose the operation limitation when an operator who may reduce safety if the joystick device and the operation unit 130 are operated is present near the joystick device and the operation unit 130, and can relax the operation limitation when an operator who can maintain safety if the joystick device and the operation unit 130 are operated is present near the joystick device and the operation unit 130. Even such control can prevent the safety from varying depending on the operator.

For other applied examples, the examples described in FIGS. 6 to 8 can be applied. For example, in the notification change control, the light-emitting pattern of the second light-emitting unit 12 may be changed to emit light in inconspicuous brightness or color when the feature satisfies the predetermined condition. In this way, it is appropriate to, when the operation limitation is relaxed, perform control in the case where the operation limitation is not imposed.

For example, the operation limitation may be relaxed only for a predetermined period on the assumption that the predetermined condition is no longer satisfied after the predetermined period has elapsed. However, the operation limitation may continuously be relaxed while continuing the determination until the predetermined condition is no longer satisfied.

The above description illustrates an example in which the transport system is mainly composed of the mobile robot 100. However, the control system according to the present embodiment may be any system such as the transport system described above as long as it performs system control for controlling a system including a mobile robot. This system may also include a server that is connectable to the mobile robot 100 via wireless communication. This server is a server that provides information for autonomous movement to the mobile robot 100. Since this server manages the mobile robot 100, it can also be referred to as "host management device".

Figure 11:
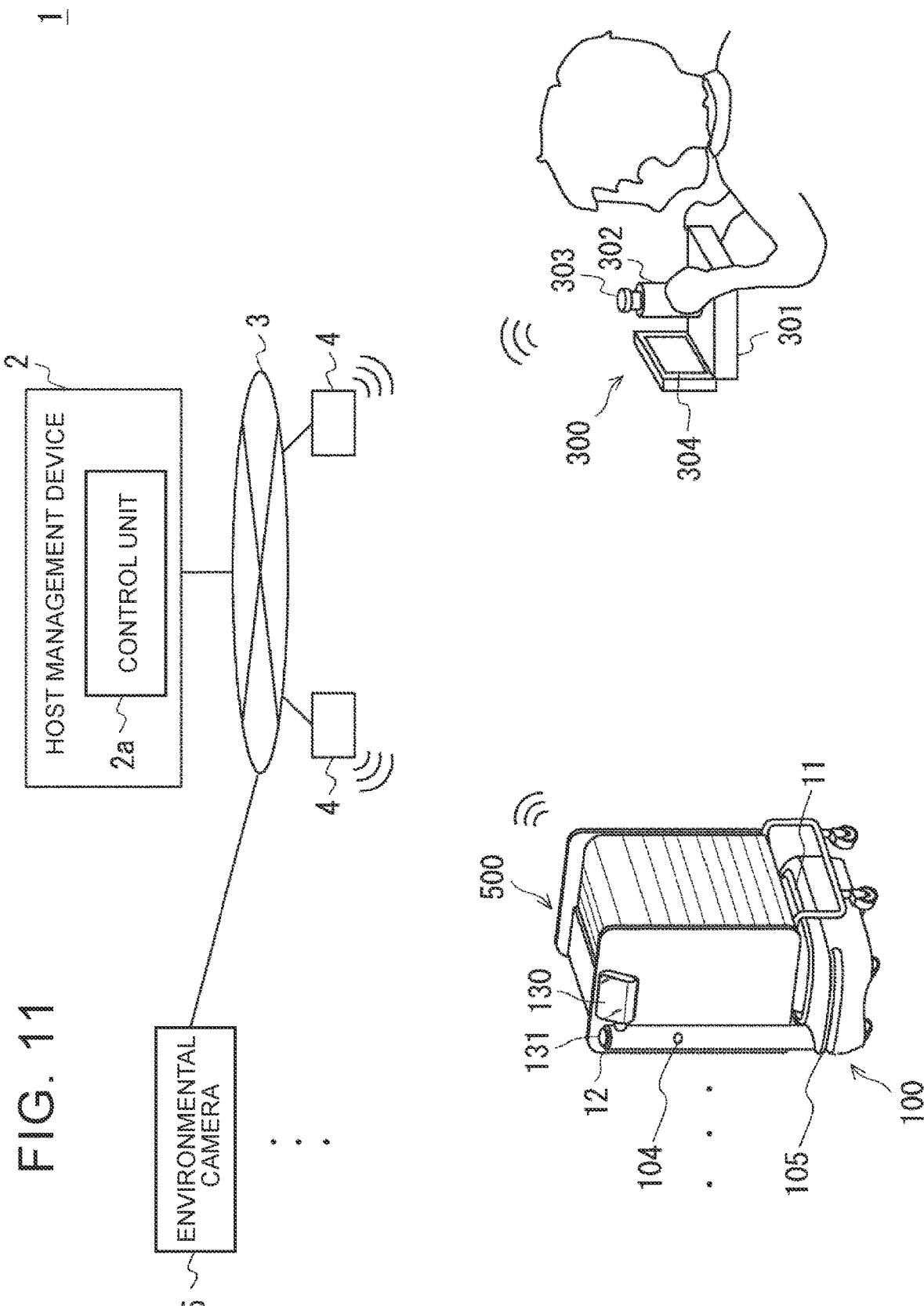
FIG. 11 is a schematic diagram showing an example of the overall configuration of a system including the mobile robot according to the embodiment.

An example in which this transport system includes the mobile robot 100 and the host management device will be described below with reference to FIG. 11. FIG. 11 is a schematic diagram showing an example of the overall configuration of the transport system including the mobile robot 100.

As shown in FIG. 11, a transport system 1 includes the mobile robot 100, a host management device 2, a network 3, a communication unit 4, an environmental camera 5, and user equipment 300. The transport system 1 is a system for transporting an object by the mobile robot 100, and includes a control system in this configuration example. In this example, the control system can refer to the mobile robot 100 and the host management device 2, or to the components of control systems provided in the mobile robot 100 and the host management device 2.

The mobile robot 100 and the user equipment 300 are connected to the host management device 2 via the communication unit 4 and the network 3. The network 3 is a wired or wireless local area network (LAN) or wide area network (WAN). The host management device 2 and the environmental camera 5 are connected to the network 3 by wire or wireless. As can be seen from this configuration, all of the mobile robot 100, the host management device 2, and the environmental camera 5 include a communication unit. For example, the communication unit 4 is a wireless LAN unit installed in each environment. The communication unit 4 may be a general-purpose communication device such as a WiFi (registered trademark) router.

The host management device 2 is a device that is connectable to the mobile robot 100 by wireless communication and is a management system that manages a plurality of mobile robots 100. The host management device 2 can include a control unit 2a for controlling the mobile robots 100. The control unit 2a can be implemented by, for example, integrated circuitry, and can be implemented by, for example, a processor such as an MPU or a CPU, a working memory, and a nonvolatile storage device. The function of the control unit 2a can be performed by the storage device storing a control program to be executed by the processor and the processor reading the program into the working memory and executing the program. The control unit 2a can be referred to as "control computer".

The transport system 1 can efficiently control the mobile robots 100 while autonomously moving the mobile robots 100 in the autonomous mode inside a predetermined facility or moving the mobile robots 100 based on user operations in the user operation mode. The "facility" can refer to various types of facility including medical and welfare facilities such as hospitals, rehabilitation facilities, nursing homes, and residential care homes for the elderly, commercial facilities such as hotels, restaurants, office buildings, event venues, and shopping malls, and other complex facilities.

In order to perform such efficient control, a plurality of environmental cameras 5 can be installed inside the facility. Each environmental camera 5 acquires an image of the range in which a person or the mobile robot 100 moves, and outputs image data representing the image. This image data may be still image data or moving image data. In the case of the still image data, the still image data is obtained at each imaging interval. In the transport system 1, the host management device 2 collects the images acquired by the environmental cameras 5 and information based on these images. As for the images that are used to control the mobile robots 100, the images etc. acquired by the environmental cameras 5 may be directly transmitted to the mobile robots 100, and in the user operation mode, may be transmitted to the user equipment 300 directly or via the host management device 2. The environmental cameras 5 can be installed as surveillance cameras in passages inside the facility or entrances to the facility.

The host management device 2 can determine, for each transport request, the mobile robot 100 to perform the transportation task, and can send, to the determined mobile robot 100, an operation command to perform the transportation task. The mobile robot 100 can autonomously move from a transport origin to a transport destination according to the operation command. In this case, the method for determining a transport route etc. is not limited.

For example, the host management device 2 assigns the transport task to the mobile robot 100 located at or near the transport origin. Alternatively, the host management device 2 assigns the transport task to the mobile robot 100 heading toward or near the transport origin. The mobile robot 100 to which the task has been assigned moves to the transport origin to pick up an object to be transported.

The user equipment 300 is a device that remotely operates the mobile robot 100 via the host management device 2 or directly in the user operation mode. The user equipment 300 can have a communication function for this remote operation, and can include a display unit 304. Various types of terminal equipment such as a tablet computer and a smartphone can be used as the user equipment 300. The user equipment 300 can also receive a switching operation of switching between the user operation mode and the autonomous mode. When this switching operation is performed, the mode of the mobile robot 100 is switched via the host management device 2. The user equipment 300 can also be used for authentication using the electronic ID described above.

An example will be given below in which the user equipment 300 includes a joystick device. The user equipment 300 can include a stick portion 302 and a button 303 as part of the joystick device in addition to a body 301. The joystick device is a device that is operated to move the mobile robot 100 in a direction intended by the user in the user operation mode. The joystick device can receive a directional operation when the stick portion 302 is tilted in a direction in which the user wants the mobile robot 100 to move. The joystick device can be controlled such that a switching operation to switch between the autonomous mode and the user operation mode is performed by depressing the button 303 downward. Alternatively, the joystick device can be controlled such that a determination operation is performed by depressing the button 303 downward. The button 303 can be configured to function as an emergency stop button by depressing the button 303 downward for a predetermined period. When the button 303 is configured to receive two or more of the switching operation, the determination operation, and the emergency stop operation, that is, when a plurality of operations is assigned to the button 303, it is appropriate to set predetermined periods associated with the individual operations.

In the case where the user equipment 300 includes the joystick device, the user can perform similar operations even when the mobile robot 100 does not include a joystick device. The mobile robot 100 may include a button similar to the button 303 on the upper surface of the stick portion 131 etc. It is assumed that, in the configuration in which the transport system 1 manages a plurality of mobile robots 100, the mobile robot 100 to be remotely operated can be selected by the user equipment 300 in the user operation mode.

The display unit 304 can display an image indicated by the image data received from the camera 104 of the mobile robot 100 and an image indicated by the image data received from the environmental camera 5 located around the mobile robot 100. This allows the user to operate the mobile robot 100 using the stick portion 302 and the button 303.

The user equipment 300 can function as a device for sending a transport request etc. to the host management device 2. This transport request can also include information indicating an object to be transported.

The change control in the transport system 1 can be performed by the control computer 101 of the mobile robot 100 when the control unit 2a of the host management device 2 recognizes the feature of the mobile body present around the operation interface and transmits, to the mobile robot 100, an instruction to change the operation limitation on the operation interface in a case where the feature satisfies the predetermined condition. Regarding examples of the feature recognition, the determination on the predetermined condition, the operation limitation, etc., the various examples described above for the case where these operations are performed by the mobile robot 100 are similarly applicable.

Although the present embodiment has been described above, the control method according to the present embodiment may be performed by the host management device 2 or by an edge device. Examples of the edge device include one or more of the environmental camera 5, the mobile robot 100, the communication unit 4, and the user equipment 300. The environmental camera 5, the mobile robot 100, and the host management device 2 may cooperate to perform the control method. That is, the control system according to the present embodiment may be installed in the environmental camera 5. Alternatively, at least part or all of the control system may be installed in a device other than the mobile robot 100, such as the host management device 2. The host management device 2 is not limited to the physically single device, and may be distributed in a plurality of devices. That is, the host management device 2 may include a plurality of memories and a plurality of processors.

The transport system 1, the host management device 2, the mobile robot 100, the user equipment 300, the environmental cameras 5, and the communication unit 4 according to the above embodiment are not limited to those having the illustrated shape and executing illustrated control, and it is sufficient as long as the function of each device can be fulfilled. In the above embodiment, an example in which the control system is incorporated into the transport system has been described. However, the control system need not be incorporated into the transport system.

Figure 12:
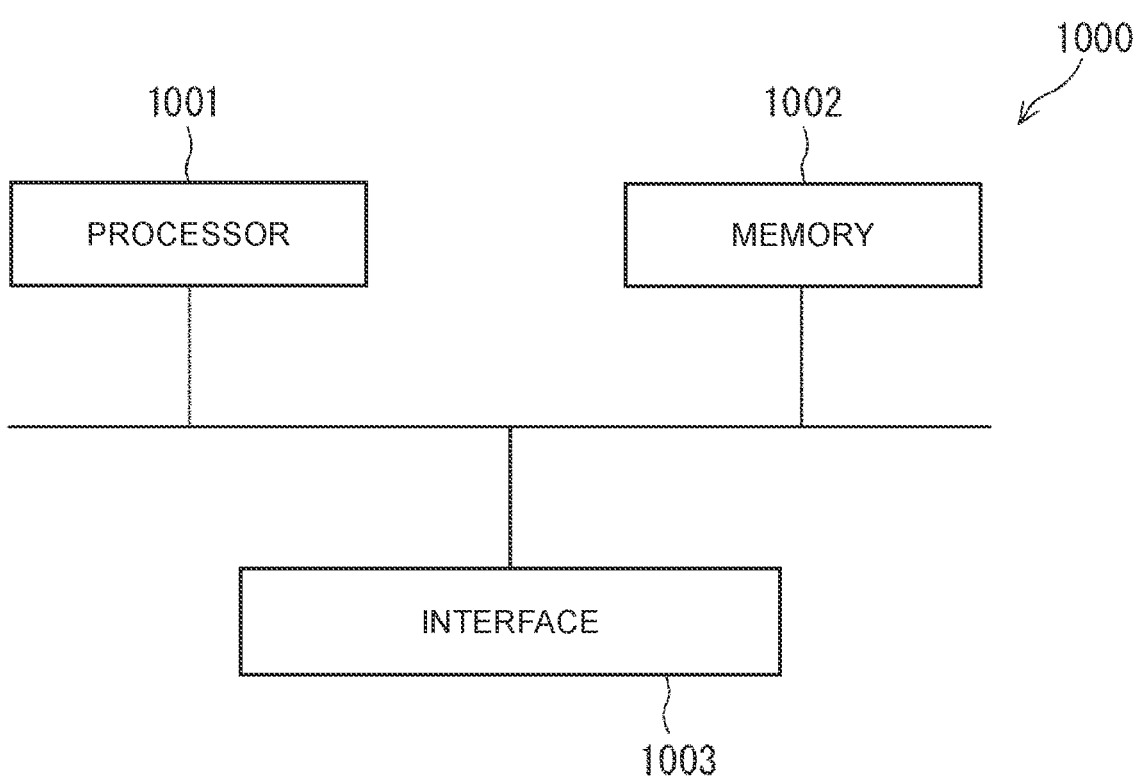
FIG. 12 is a diagram showing an example of the hardware configuration of a device.

Each of the control computer 101 of the mobile robot 100, the host management device 2, the environmental camera 5, and the user equipment 300 according to the above embodiment can have, for example, the following hardware configuration. FIG. 12 shows an example of the hardware configuration of each device.

A device 1000 shown in FIG. 12 can include a processor 1001, a memory 1002, and an interface 1003. The interface 1003 can include, for example, a communication interface, an interface with a drive unit, a sensor, an input and output device, etc. as necessary by the individual device.

The processor 1001 may be, for example, an MPU, a CPU, or a graphics processing unit (GPU). The processor 1001 may include a plurality of processors. The memory 1002 is, for example, a combination of a volatile memory and a nonvolatile memory. The functions of each device are implemented by the processor 1001 reading a program stored in the memory 1002 and executing the program while sending and receiving necessary information via the interface 1003.

The program includes a group of instructions (or software codes) for causing a computer (processor) to perform one or more of the functions described in the embodiment when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD), and other memory technologies, a compact disc read-only memory (CD-ROM), a digital versatile disc (DVD), a Blu-ray (registered trademark) disc, and other optical disc storages, and a magnetic cassette, a magnetic tape, a magnetic disk storage, and other magnetic storage devices. The program may be transmitted on a transitory computer-readable medium or a communication medium. Examples of the transitory computer-readable medium or the communication medium include, but are not limited to, propagating signals in electrical, optical, acoustic, or other forms.

The present disclosure is not limited to the embodiment described above, and may be modified as appropriate without departing from the spirit and scope of the disclosure.

What is claimed is:

1. A control system comprising one or more processors configured to perform system control for controlling a system including a mobile robot configured to move in a hospital, the mobile robot being configured to move autonomously and to be operated by a user through an operation interface wherein:

the one or more processors are configured to:
(a) determine whether a person within a threshold distance from the operation interface is a nurse, based on information on a color of clothing of the person;

(b) in a case where the person is determined to be a nurse, display on the operation interface an emergency stop button, a nurse call button, a mode switching button, a destination change button, a route change button, a wagon unloading button, and a move-to-charging-location button;

(c) in a case where the person is determined not to be a nurse, display only the nurse call button on the operation interface; and (d) the nurse call button is a button configured to call a nurse.

2. The control system according to claim 1, wherein the operation interface includes at least one of an interface to be displayed on a display device installed on the mobile robot, a joystick device installed on the mobile robot, and an operation device configured to remotely operate the mobile robot.

3. The control system according to claim 2, wherein the operation interface includes the joystick device, and in a case where the person is determined not to be a nurse, the one or more processors are configured to mechanically fixing the joystick device to prohibit all operations by the joystick device.

4. The control system according to claim 1, wherein the one or more processors are configured to determine whether the person is a nurse based on a surrounding image of the operation interface.

5. The control system according to claim 1, wherein the one or more processors are configured to determine whether the person is a nurse using a learning model configured to receive the surrounding image and output information indicating whether the person is a nurse based the information on the color of clothing of the person.

6. A control method comprising performing system control for controlling a system including a mobile robot configured to move in a hospital, the mobile robot being configured to move autonomously and to be operated by a user through an operation interface, the method comprising:

(a) determine whether a person within a threshold distance from the operation interface is a nurse, based on information on a color of clothing of the person;

(b) in a case where the person is determined to be a nurse, display on the operation interface an emergency stop button, a nurse call button, a mode switching button, a destination change button, a route change button, a wagon unloading button, and a move-to-charging-location button;

(c) in a case where the person is determined not to be a nurse, display only the nurse call button on the operation interface; and (d) the nurse call button is a button configured to call a nurse.

7. The control method according to claim 6, wherein the operation interface includes at least one of an interface to be displayed on a display device installed on the mobile robot, a joystick device installed on the mobile robot, and an operation device configured to remotely operate the mobile robot.

8. The control method according to claim 6, wherein the determination of whether the person is a nurse is based a surrounding image of the operation interface.

9. The control method according to claim 6, wherein the determining of whether the person is a nurse is made using a learning model configured to receive the surrounding image and output information indicating whether the person is a nurse based on the information on the color of clothing of the person.

10. A non-transitory storage medium storing instructions that are executable by one or more processors and that cause the one or more processors to perform functions comprising performing a process of performing system control for controlling a system including a mobile robot configured to move in a hospital, the mobile robot being configured to move autonomously and to be operated by a user through an operation interface wherein:

the instructions, when executed by the one or more processors, cause the one or more processors to:

(a) determine whether a person within a threshold distance from the operation interface is a nurse, based on information on a color of clothing of the person;

(b) in a case where the person is determined to be a nurse, display on the operation interface an emergency stop button, a nurse call button, a mode switching button, a destination change button, a route change button, a wagon unloading button, and a move-to-charging-location button;

(c) in a case where the person is determined not to be a nurse, display only the nurse call button on the operation interface; and (d) the nurse call button is a button configured to call a nurse.

* * * * *